(12) United States Patent
Streijl et al.

(10) Patent No.: US 8,064,348 B2
(45) Date of Patent: Nov. 22, 2011

(54) GATHERING TRAFFIC PROFILES FOR ENDPOINT DEVICES THAT ARE OPERABLY COUPLED TO A NETWORK

(75) Inventors: Robert Streijl, Cumming, GA (US); Christopher Briggs, Hiram, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 659 days.

(21) Appl. No.: 11/839,234

(22) Filed: Aug. 15, 2007

(65) Prior Publication Data
US 2009/0046720 A1 Feb. 19, 2009

(51) Int. Cl.
*G01R 31/08* (2006.01)
*H04L 12/28* (2006.01)
*G06F 15/173* (2006.01)
(52) U.S. Cl. ......... 370/241; 370/252; 370/394; 709/224
(58) Field of Classification Search .................. None
See application file for complete search history.

(56) References Cited

U.S. PATENT DOCUMENTS

| 6,940,821 | B1* | 9/2005 | Wei et al. | 370/244 |
|---|---|---|---|---|
| 7,756,033 | B2* | 7/2010 | Abbazia et al. | 370/235 |
| 7,822,789 | B2* | 10/2010 | Jiang | 707/812 |
| 2007/0140133 | A1* | 6/2007 | Gudipalley et al. | 370/242 |
| 2007/0268882 | A1* | 11/2007 | Breslau et al. | 370/346 |
| 2009/0303892 | A1* | 12/2009 | Yamasaki | 370/252 |

* cited by examiner

*Primary Examiner* — Nittaya Juntima
(74) *Attorney, Agent, or Firm* — Cantor Colburn LLP (57) ABSTRACT

Methods and computer program products for gathering a traffic profile for an endpoint device operably coupled to a network. Methods include simultaneously sending a set of numerically sequenced packets to a plurality of endpoint devices on the network including the endpoint device, wherein the plurality of endpoint devices are time synchronized with the numerically sequenced packets; receiving the numerically sequenced packets at the endpoint device; electronically storing packet data for the numerically sequenced packets at the endpoint device, wherein the packet data is stored for a user configurable time period; collecting the packet data within the user configurable time period; and using the collected packet data to determine packet loss information or packet sequence information for the endpoint device.

8 Claims, 6 Drawing Sheets

GATHERING TRAFFIC PROFILES FOR ENDPOINT DEVICES THAT ARE OPERABLY COUPLED TO A NETWORK

FIELD OF THE INVENTION

Exemplary embodiments relate generally to networks, and more particularly, to methods, apparatuses and computer program products for gathering traffic profiles for endpoint devices that are operably coupled to a network.

BACKGROUND OF THE INVENTION

Many communication systems include a plurality of endpoint devices such as computers, media presentation devices, set-top boxes, or various combinations thereof, operatively coupled to a network such as the Internet, an intranet, a content delivery system, or the like. In order to enable these systems to perform properly, it may be necessary to gather data characterizing the hardware environment and software environment for each of the endpoint devices. At present, many help desk calls are attributable to issues involving a customer's internal network. Moving into the world of Internet Protocol television (IPTV) and video-on-demand (VOD), a properly running internal network will be critical to customer satisfaction. Accordingly, what is needed is a technique for gathering data about endpoint devices connected to networks, so as to permit troubleshooting of customer problems, and also to enable preventative actions to be taken before a problem occurs.

SUMMARY OF THE INVENTION

Exemplary embodiments relate to methods and computer program products for gathering a traffic profile for one or more endpoint devices that are operably coupled to a network. According to one set of exemplary embodiments, the methods include gathering traffic profiles for one or more endpoint devices operably coupled to a network by simultaneously sending a set of numerically sequenced packets to a first endpoint device on the network and a second endpoint device on the network. The first endpoint device and second endpoint device are all time synchronized with the numerically sequenced packets. The numerically sequenced packets are received at the first endpoint device and the second endpoint device. Packet data is electronically stored at the first endpoint device and the second endpoint device for at least a user configurable time period. The packet data is collected within the user configurable time period. The collected packet data is employed to determine packet loss information and packet sequence information for at least one of the first endpoint device or second endpoint device.

According to another set of exemplary embodiments, computer program products for gathering a traffic profile for one or more endpoint devices operably coupled to a network include a storage medium readable by a processing circuit and storing instructions for execution by the processing circuit for facilitating a method. The method includes gathering traffic profiles for one or more endpoint devices operably coupled to a network by simultaneously sending a set of numerically sequenced packets to a first endpoint device on the network and a second endpoint device on the network. The first endpoint device and second endpoint device are all time synchronized with the numerically sequenced packets. The numerically sequenced packets are received at the first endpoint device and the second endpoint device. Packet data is electronically stored at the first endpoint device and the second endpoint device for at least a user configurable time period. The packet data is collected within the user configurable time period. The collected packet data is employed to determine packet loss information and packet sequence information for at least one of the first endpoint device or second endpoint device.

Another set of exemplary embodiments relate to methods and computer program products for gathering a traffic profile for one or more endpoint devices on an internal network operably coupled to an external network through a network address translation (NAT) router. The methods include sending a first test signal to identify one or more endpoint devices operatively coupled to the internal network, receiving a response to the first test signal from one or more of the endpoint devices, sending a second test signal for performing a traffic profile measurement including at least one of a delay or an available bandwidth, receiving a response to the second test signal, and using the received response to the second test signal to compute the traffic profile measurement.

Computer program products for gathering a traffic profile for one or more endpoint devices on an internal network operably coupled to an external network through a network address translation (NAT) router include a storage medium readable by a processing circuit and storing instructions for execution by the processing circuit for facilitating a method. The methods include sending a first test signal to identify one or more endpoint devices operatively coupled to the internal network, receiving a response to the first test signal from one or more of the endpoint devices, sending a second test signal for performing a traffic profile measurement including at least one of a delay or an available bandwidth, receiving a response to the second test signal, and using the received response to the second test signal to compute the traffic profile measurement.

DETAILED DESCRIPTION OF THE INVENTION

Figure 1:
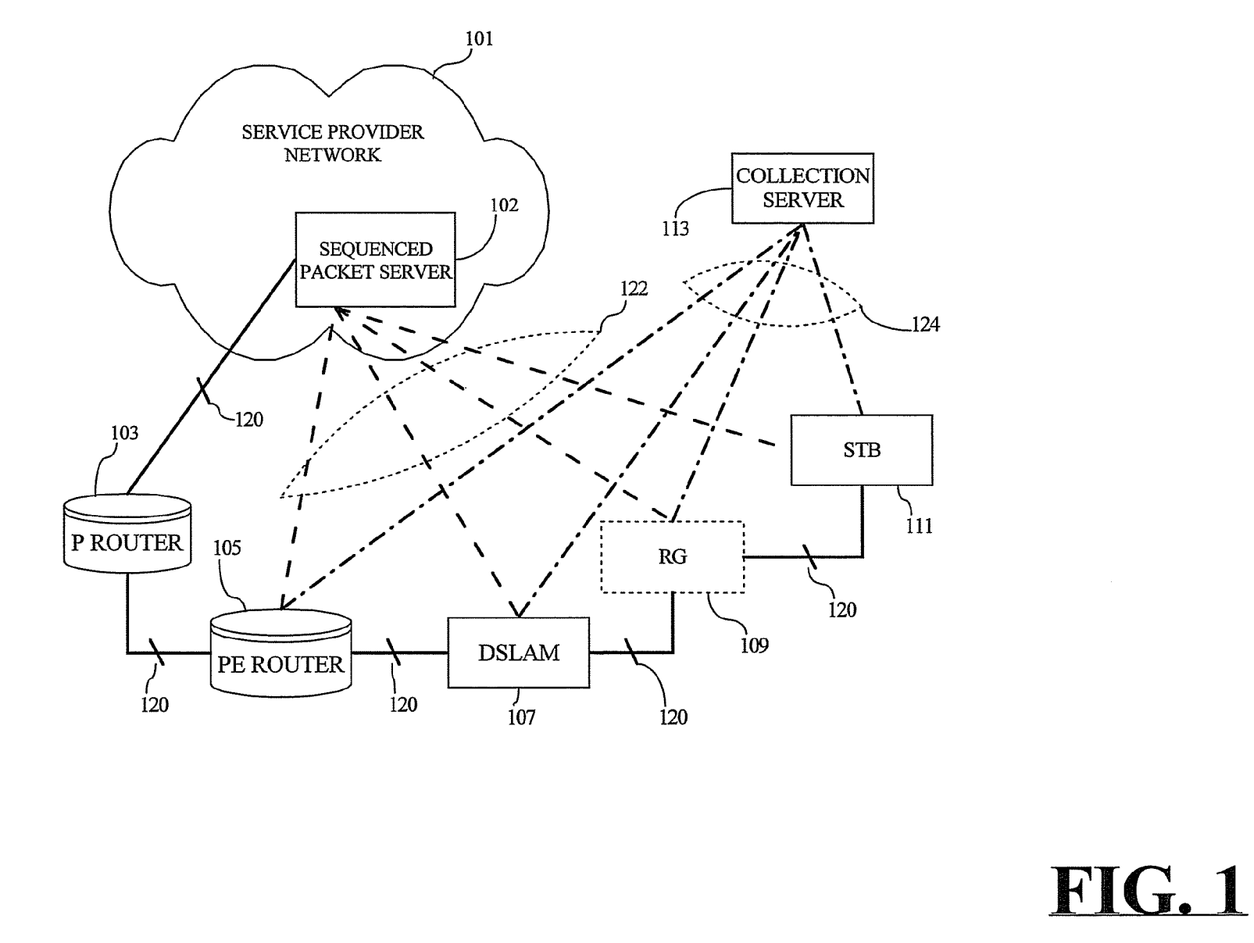
FIG. 1 is a block diagram of a first exemplary system that may be utilized to gather traffic profiles for endpoint devices operably coupled to a network.

FIG. 1 is a block diagram of a first exemplary system that may be utilized to gather traffic profiles for endpoint devices that are operably coupled to a network. In the example of FIG. 1, an optional NAT router is implemented as an optional residential gateway (RG) 109. A service provider network 101 provides one or more customers with a communications service such as video, audio, voice over Internet Protocol (VoIP), Internet Protocol television (IPTV), or any of various combinations thereof. The service provider network 101 is operably coupled to RG 109 as well as a provider (P) router 103, a provider edge (PE) router 105, a digital subscriber line access multiplexer (DSLAM) 107, and a set top box (STB) 111 using a physical communications path 120.

According to exemplary embodiments, the P router 103 functions as a packet forwarding machine. A plurality of access nodes aggregate into the PE router 105. The PE router 105 may implement quality of service (QoS) markings for packets and perform Multiprotocol Label Switching (MPLS). MPLS is a standards-approved technology for speeding up network traffic flow and making traffic flow easier to manage. MPLS sets up a specific path for a given sequence of packets. This packet sequence is identified by a label placed into each packet, thus saving the time required for a router to look up an address for the next node to which the packet should be forwarded. MPLS is called multiprotocol because it functions with Internet Protocol (IP), Asynchronous Transport Mode (ATM), frame relay network protocols, and various combinations thereof.

The STB 111 represents an endpoint device on an internal network such as a set-top box, computing device, microprocessor-based device, media presentation device, data storage drive, or other device. In the example of FIG. 1, the STB 111 may, but need not, be assigned a public IP address. The DSLAM 107 is an endpoint device on an external network, possibly located at a telephone company central office, that receives signals from multiple customer Digital Subscriber Line (DSL) connections and places these multiple signals on a high-speed backbone line using multiplexing techniques. Depending on the specific design implementation, the DSLAM 107 may connect DSL lines with some combination of asynchronous transfer mode (ATM), frame relay, or Internet Protocol networks. The DSLAM 107 enables a phone company to offer business and home users high-speed broadband connectivity using fast backbone network technology (ATM).

As indicated previously, the RG 109 may be implemented using a NAT router. Moreover, although FIG. 1 utilizes the RG 109, it is to be understood that the configuration of FIG. 1 is equally applicable to non-residential environments and business environments. Internal addresses for the various endpoint devices on the internal network of FIG. 1 may be selected from one or more specially designated private IP address subnets. For example, the private IP address subnets designated by RFC 1918 are 192.168.x.x, 172.16.x.x through 172.31.x.x, and 10.x.x.x. Accordingly, the RG 109 may implement communication with a specified endpoint device by assigning an internal address (such as 192.168.0.1) selected from this private IP address space. The RG 109 connects to the Internet (or other network) using a single external address from "public" IP address space. This arrangement is sometimes referred to as "overloaded" NAT.

To implement outbound communications whereby traffic passes from an endpoint device on an internal network to the service provider network 101, a source address in each packet may be translated "on the fly" from the assigned internal address of the endpoint device to the external address. The RG 109 tracks basic data about each active endpoint device connection, such as a destination address and a router port to which the endpoint device is connected. When the RG 109 receives a reply from the service provider network 101, the RG 109 uses connection tracking data that was previously stored during outbound communications for determining which endpoint device on RG 109 the reply should be forwarded to. For example, Transmission Control Protocol (TCP) or User Datagram Protocol (UDP) client port numbers may be used to demultiplex the packets on receipt of incoming packets from the Internet. To a system on the service provider network 101, the RG 109 itself appears to be the source and destination for this packet traffic.

The service provider network 101 includes a sequenced packet server 102. The sequenced packet server 102 may simultaneously send a set of numerically sequenced packets to a NAT router such as the RG 109, a first endpoint device on the external network such as the DSLAM 107, and a second endpoint device on the internal network such as the STB 111. The RG 109, DSLAM 107, and STB 111 are all time synchronized with the sequenced packet server 102. The sequenced packets are sent along a first set of paths 122. The RG 109, DSLAM 107 and STB 111 receive the numerically sequenced packets sent by the sequenced packet server 102.

Packet data is electronically stored for a user configurable time period at the first endpoint device, the second endpoint device, and the NAT router. The packet data is collected within a user configurable time period, illustratively by a collection server 113 along a second set of paths 124 which may, but need not, represent DSL Forum Technical Recommendation TR-069 connections. The collection server 113 uses the collected packet data to determine packet loss information and packet sequence information for at least one of the NAT router, first endpoint device, or second endpoint device.

FIG. 1 shows the STB 111 as one illustrative example of an internal network device, it being clearly understood that other types of devices may be employed in addition to, or in lieu of, the STB 111. Moreover, the configuration of FIG. 1 could, but need not, include a plurality of the STBs 111. Internal network devices may be devices on a home network, a business network, or any other type of network. The physical communications path 120 may represent any type of communication link such as DSL, Ethernet, cable, WiMax, wireless, satellite, or various combinations thereof. Any media access type or types may be supported on a communications path between the PE router 105, DSLAM 107 and RG 109 as long as these media access type or types are capable of carrying IP packets. For example, in an internal network comprising a home network, the physical and media types that are capable of carrying packets may, but need not, include 802.11 wireless, Ethernet, Data over electrical power line (such as HomePlug AV), HPNA, MoCA, or others.

Although FIG. 1 shows the sequenced packet server 102, P router 103, PE router 105, DSLAM 107, RG 109 and STB 111 as separate elements, this is for illustrative purposes only, as one or more of these elements may be combined into a single element. Moreover, servers or routers in addition to those shown may be employed. For example, the system of FIG. 1 could include several PE routers and P routers, one or more of which are operatively coupled to the sequenced packet server 102, service provider network 101, or DSLAM 107. Likewise, the sequenced packet server 102 could, but need not, be included within the service provider network 101.

Figure 2:
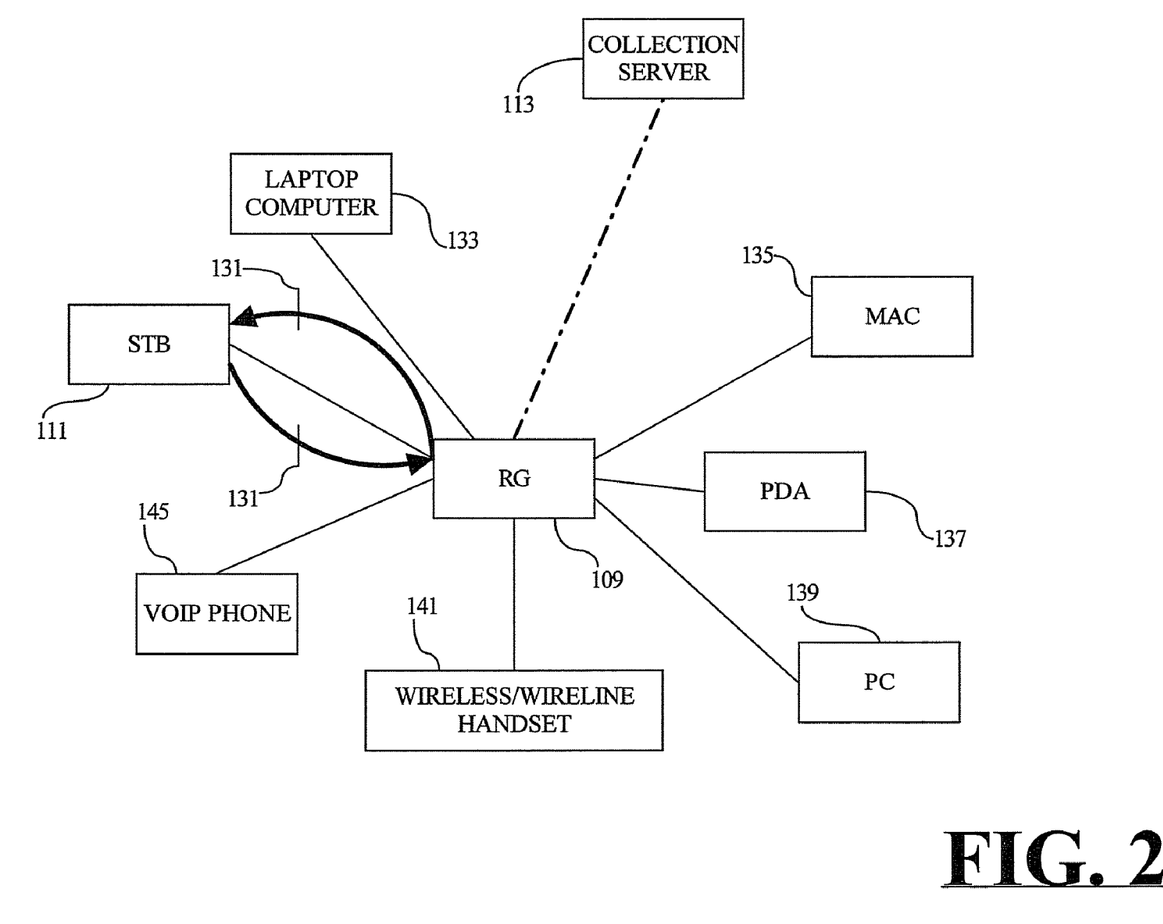
FIG. 2 is a block diagram of a second exemplary system that may be utilized to gather traffic profiles for endpoint devices operably coupled to an external network through a NAT router.

FIG. 2 is a block diagram of a second exemplary system that may be utilized to gather traffic profiles for endpoint devices on an internal network that are operably coupled to an external network through a NAT router such as the RG 109. In the example of FIG. 2, these endpoint devices include a laptop computer 133, a MacIntosh (MAC) computer 135, a personal digital assistant (PDA) 137, a personal computer (PC) 139, a wireless/wireline handset 141, a voice over Internet Protocol (VoIP) phone 145, and a set top box (STB), such as the STB 111. The RG 109 is operatively coupled to a collection server, such as the collection server 113, programmed to collect profile data pertaining to the internal network.

FIG. 2 shows the foregoing endpoint devices 133, 135, 137, 139, 141, 145, and 111 as being illustrative examples of internal network device, it being clearly understood that other types of devices may be employed in addition to, or in lieu of, the devices shown in FIG. 2. Moreover, the configuration of FIG. 2 could, but need not, include a plurality of the STBs 111. Likewise, one or more of the STBs 111 could, but need not, be assigned a public IP address. Internal network devices may be devices on a home network, a business network, or any other type of network.

A path 131 from the RG 109 to the STB 111 and back to the RG 109 represents a round-trip path for which performance measurements for the internal network of FIG. 2 may be conducted. Essentially, the path 131 represents a two-way measurement path for determining a profile for the internal network of FIG. 2. Two-way measurement paths also exist between the RG 109 and each of the other endpoint devices described above, such as the laptop computer 133, the MAC 135, the PDA 137, the PC 139, the wireless/wireline handset 141, and the VoIP phone 145. The process by which these performance measurements are determined by the RG 109 and acquired by the collection server 113 is described in greater detail hereinafter with reference to FIG. 4.

Note that, when one-way measurements are employed in connection with the configuration of FIG. 1, then the measurement result can be stored in an endpoint device, as opposed to being stored in the RG 109 in the case of two-way measurements. In other words, a TR-069 or similar protocol may be used to communicate with these endpoints, or some other mechanism (protocol) may be used to get the measurement result from the end-point back to the RG 109.

Returning now to FIG. 2, two-way measurement paths such as the path 131 provide a relatively simple technique for determining a profile for an internal network. However, one-way measurement paths could be employed in lieu of two-way measurement paths. Although one-way measurement paths provide greater potential accuracy than two-way measurement paths, these one-way measurement paths require use of synchronized clocks at the RG 109 and at least one endpoint device, according to exemplary embodiments. The synchronized clocks should provide accuracy on the order of a few microseconds.

Figure 3:
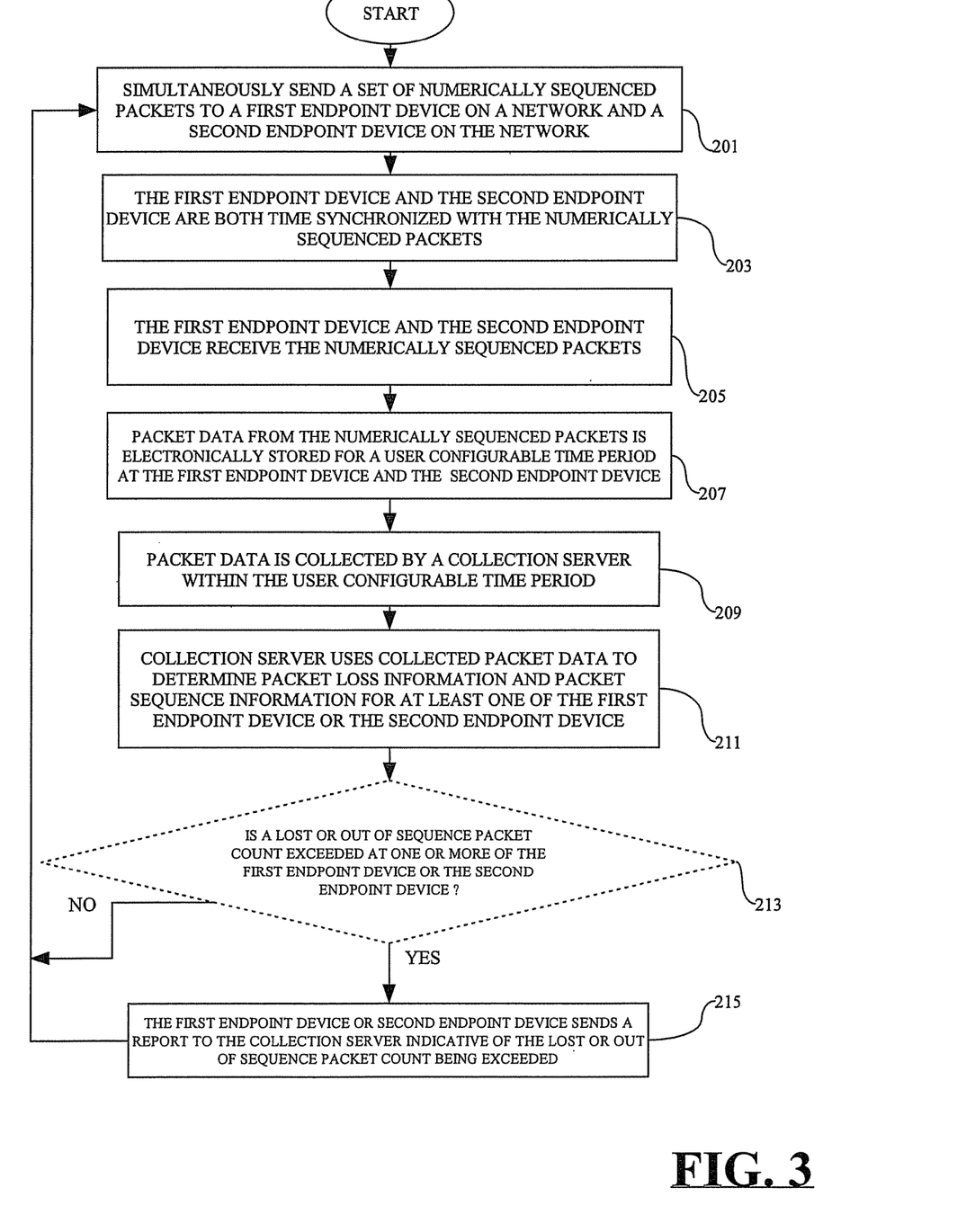
FIG. 3 is a flow diagram of an exemplary process for using a packet server to gather traffic profiles of endpoint devices operably coupled to a network.

FIG. 3 is a flow diagram of an exemplary process for using the sequenced packet server 102 (FIG. 1) to gather traffic profiles of endpoint devices operably coupled to a network such as the service provider network 101. The procedure of FIG. 3 commences at block 201 where a set of numerically sequenced packets is simultaneously sent to a first endpoint device on the network 101 and a second endpoint device on the network 101. For example, the first endpoint device could, but need not, b the DSLAM 107 (FIG. 1) and the second endpoint device could, but need not, be the STB 111. The set of numerically sequenced packets may have the same quality of service (QoS) designation as a service offered by the service provider network 101, such as voice over Internet Protocol (VoIP), Internet Protocol television (IPTV), or the like. In some implementations, the set of numerically sequenced packets may be simultaneously sent to all address destinations known to the RG 109, or all address destinations on the service provider network 101, or both.

Next, at block 203 (FIG. 3), the first endpoint device and the second endpoint device are both time synchronized with the numerically sequenced packets. The first endpoint device and second endpoint device receive the numerically sequenced packets (block 205). However, the first endpoint device and second endpoint device do not send out any reply in response to these numerically sequenced packets. Packet data from the numerically sequenced packets is electronically stored at the first endpoint device and second endpoint device (block 207). This packet data could be data contained within the packet itself, data derived from the packet such as a packet arrival time, or both. According to exemplary embodiments, packet data is any data that enables a determination of packet loss or out of sequence information (or both) for packets traveling between any of the DSLAM 107 (FIG. 1), the RG 109 or the STB 111. Optionally, the packet data may enable a determination as to whether there are any differences in packet loss for the DSLAM 107 relative to the RG 109 or the STB 111. The packet data is electronically stored for at least as long as the duration of a user-configurable time period.

The electronically stored packet data is collected by a collection server, such as the collection server 113, within the user-configurable time period (FIG. 3, block 209). Collection may, but need not, be performed using a DSL Forum Technical Requirement 069 (TR-069) compliant method. The collection server 113 uses the collected packet data to determine at least one of: (i) packet loss information, or (ii) packet sequence information; for one or more of: (a) the NAT router, (b) the first endpoint device, or (c) the second endpoint device (block 211). The procedure then loops back to block 201 or continues to optional block 213.

At optional block 213, a test is performed to ascertain whether or not a lost or out of sequence packet count threshold is exceeded at one or more of the first endpoint device or second endpoint device. This threshold may be set at the service provider network 101 (FIG. 1). If the lost or out of sequence packet count does not exceed the count threshold, the program loops back to block 201 (FIG. 3). The affirmative branch from block 213 leads to block 215 where the first endpoint device or second endpoint device sends a report to the collection server 113 (FIG. 1) indicative of the lost or out of sequence packet count being exceeded. The procedure then loops back to block 201 (FIG. 3).

Figure 4:
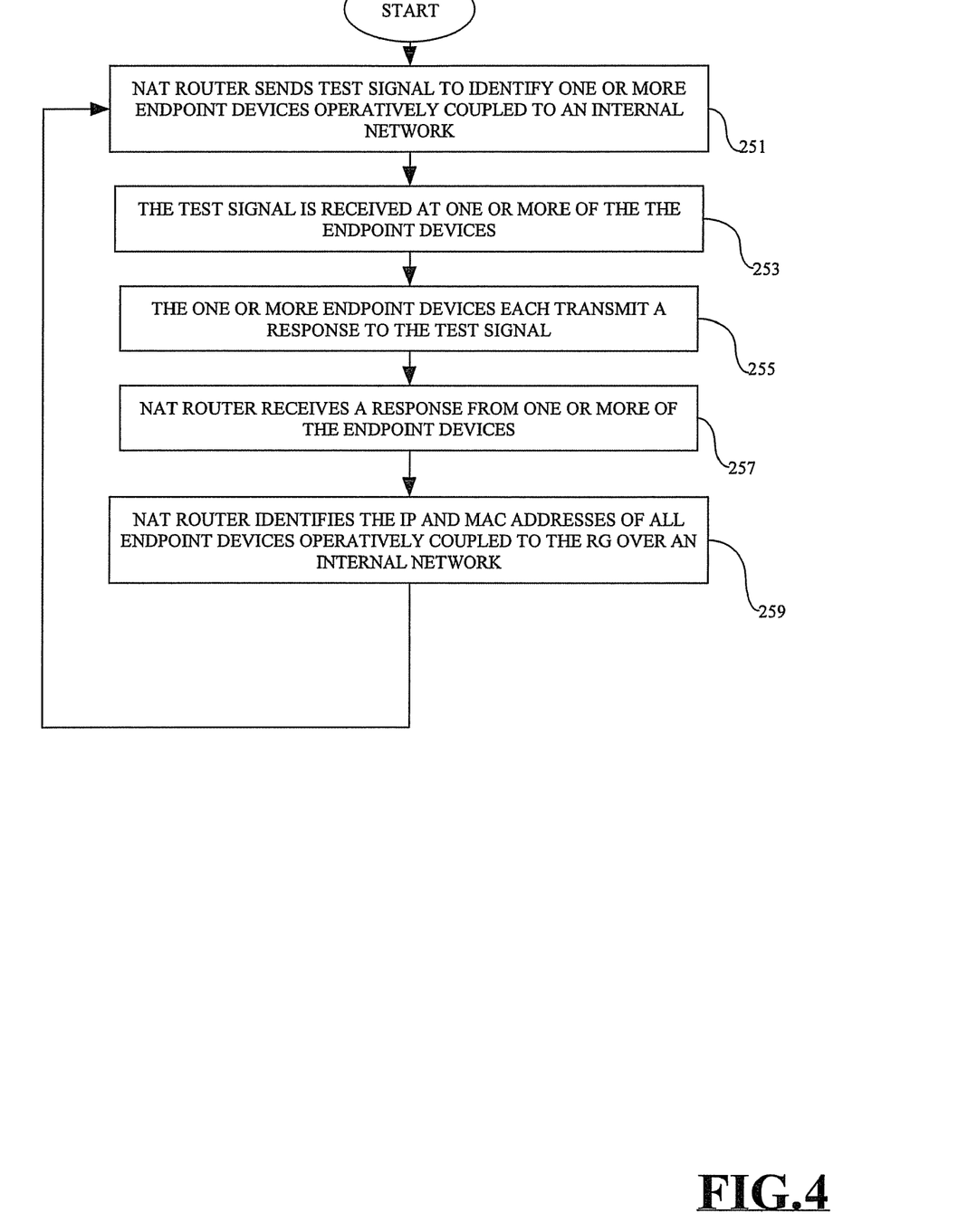
FIG. 4 is a flow diagram of a first exemplary process for using a residential gateway to gather traffic profiles of endpoint devices operably coupled to an external network through the residential gateway.

FIG. 4 is a flow diagram of a first exemplary process for using a NAT router such as the RG 109 (FIG. 2) to gather traffic profiles of endpoint devices on an internal network operably coupled to an external network through the NAT router. The NAT router sends a first test signal, such as a ping, to identify one or more endpoint devices operatively coupled to the internal network (FIG. 4, block 251). The first test signal is received at one or more of the endpoint devices (block 253), and these endpoint devices then each transmit a response to the first test signal (block 255). The NAT router receives a response from one or more of the endpoint devices (block 257) and identifies the IP and MAC addresses of all endpoint devices operably coupled to the NAT router over an internal network (block 259). The procedure then loops back to block 251.

Returning to block 255, if an endpoint device responds to the first test signal sent by the NAT router, that endpoint device is said to be reachable or accessible. Accordingly, the NAT router may build a table that includes IP and MAC addresses for all endpoint devices on the internal network that are currently reachable or accessible. After expiration of a predetermined time period, the table could (but need not) be deleted, whereupon the procedures of blocks 251 through 259 are repeated to obtain updated information about reachable or accessible endpoint devices.

Figure 5:
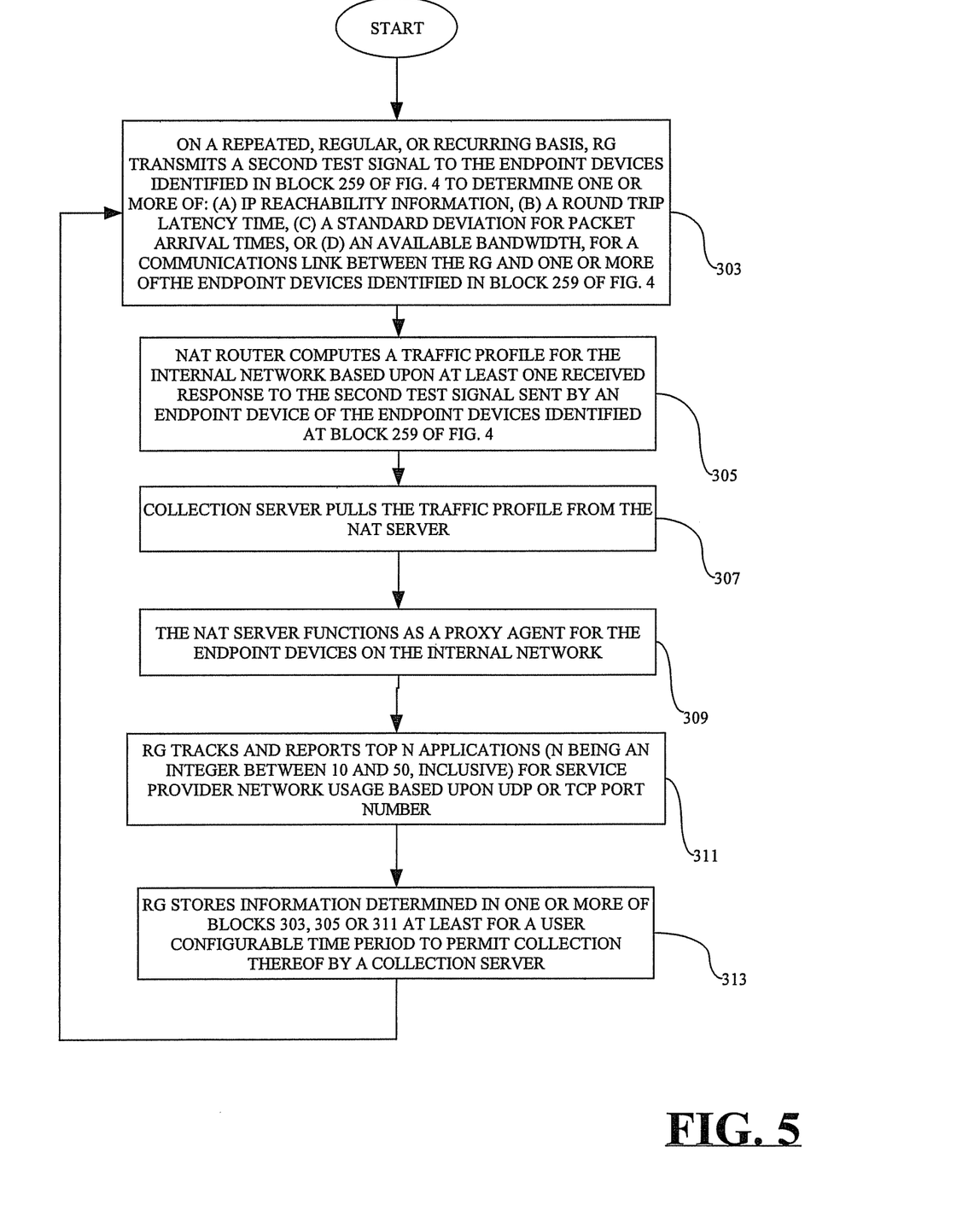
FIG. 5 is a flow diagram of a second exemplary process for using a residential gateway to gather traffic profiles of endpoint devices operably coupled to an external network through the residential gateway.

FIG. 5 is a flow diagram of a second exemplary process for using a NAT router such as the RG 109 (FIG. 2) to gather traffic profiles of endpoint devices on an internal network operably coupled to an external network through the NAT router. The procedure of FIG. 5 commences at block 303 (FIG. 5) where, on a repeated, regular, or recurring basis, the RG 109 transmits a second test signal to the endpoint devices identified in block 259 of FIG. 4 to determine one or more of: (a) IP reachability/accessibility information, (b) a round trip (or two way) latency time, (c) a standard deviation for packet arrival times, or (d) an available bandwidth for a communications link between the RG 109 and one or more of the endpoint devices identified in the immediately preceding block. These endpoint devices may include any of the laptop computer 133 (FIG. 2), STB 111, VoIP phone 145, wireless/wireline handset 141, PC 139, PDA 137, MAC 135, or other types of endpoint devices. Next, at block 305, the NAT router computes a traffic profile for the internal network based upon at least one received response to the second test signal. If all endpoint devices on the internal network can be synched to a single clock, then one-way measurements may be conducted with reference to the NAT router (i.e., the RG 109, FIG. 2), and the traffic profile determined based upon that timing. Regardless of whether or not one-way measurements are performed, the collection server 113 (FIG. 2) pulls the traffic profile from the NAT router (FIG. 5, block 307) and the NAT router then functions as a proxy agent for other devices on the internal network (block 309).

The RG 109 tracks and reports the top N applications for the service provider network 101 (FIG. 1) usage based upon a UDP or TCP port number (FIG. 5, block 311), where N is an integer between 10 and 50, inclusive. At block 313, the RG 109 then stores the information determined in at least one of blocks 303, 305 or 311 at least for a user configurable time period to permit collection of the information by the collection server 113 (FIG. 1). The procedure then loops back to block 303 (FIG. 5).

Figure 6:
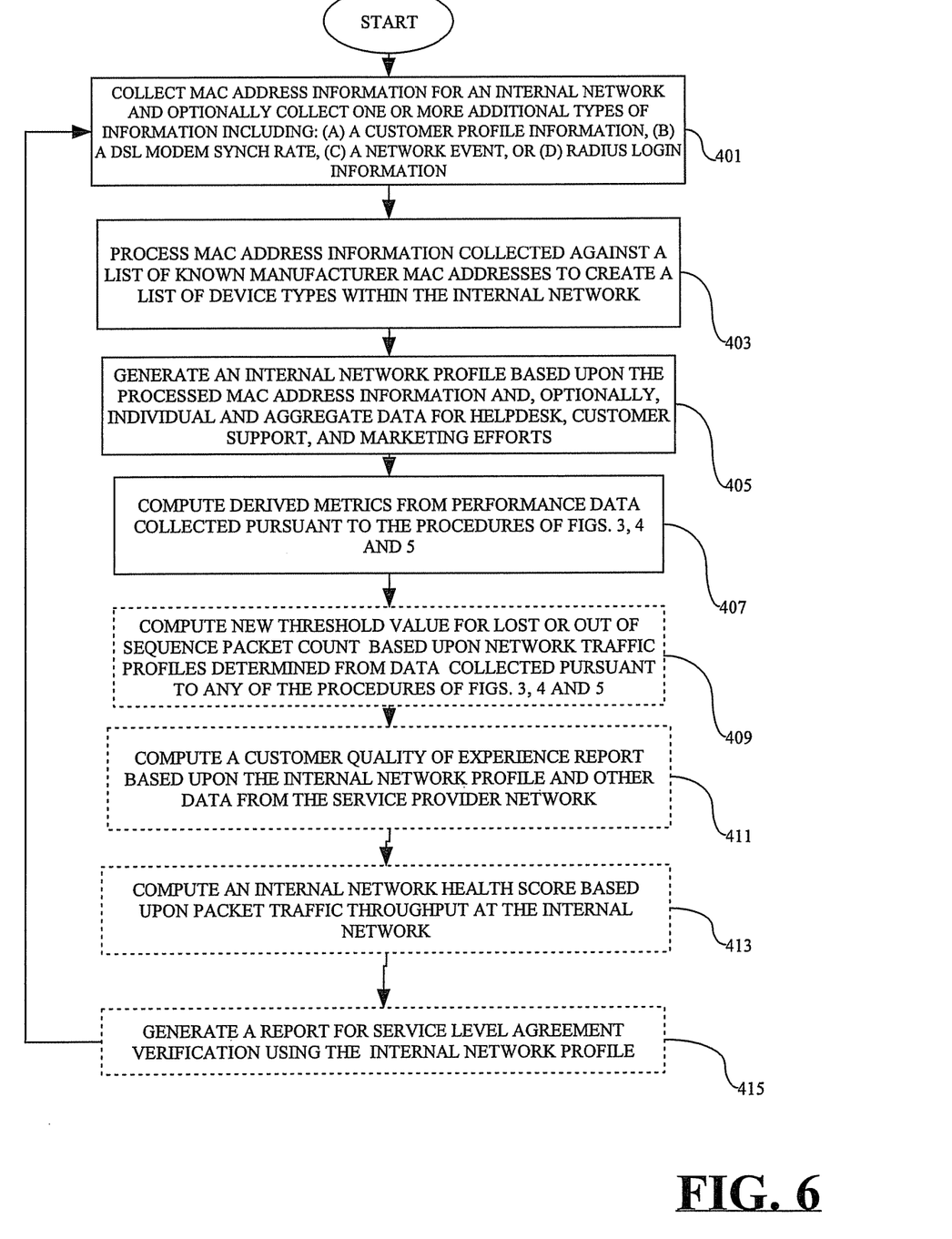
FIG. 6 is a flow diagram of an exemplary process for using a collection server to gather traffic profiles of endpoint devices on an internal network operably coupled to an external network through a NAT router.

FIG. 6 is a flow diagram of an exemplary process for using the collection server 113 (FIGS. 1 and 2) to gather traffic profiles of endpoint devices on an internal network operably coupled to an external network through a NAT router such as the RG 109 (FIGS. 1 and 2). The procedure of FIG. 6 commences at block 401 where media access control (MAC) address information for an internal network is collected by the collection server. Optionally, one or more additional types of information are collected including: (a) customer profile information, (b) a DSL modem synch rate, (c) a network event, or (d) radius login information. Next (block 403), the collection server 113 compares the collected MAC address information against a list of known manufacturer MAC addresses to create a list of device types within the internal network.

At block 405, the collection server 113 generates a network profile for the internal network based upon the processed MAC address information and, optionally, individual and aggregate data for help desk, customer support, and marketing efforts. The collection agent server 113 computes a set of derived metrics at block 407 from performance data collected pursuant to any of the procedures set forth in FIGS. 3, 4, and 5 (discussed previously). The program then loops back to block 401 or continues to optional block 409.

At optional block 409, a new threshold value is computed for a lost or out of sequence packet count based upon network traffic profiles determined from data collected using any of the procedures of FIGS. 3, 4 and 5. A customer quality of experience report is computed or generated at optional block 411 (FIG. 6) based upon the internal network profile and other data from the service provider network 101 (FIG. 1). Next (FIG. 6, optional block 413), an internal network health score is computed based upon packet traffic throughput at the internal network. At optional block 415, a report is generated for service level agreement (SLA) verification using the internal network profile. The procedure then loops back to block 401.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method of gathering a traffic profile for an endpoint device operably coupled to a network, the method comprising:

sending a set of numerically sequenced packets substantially simultaneously to a plurality of endpoint devices on the network including the endpoint device, wherein the plurality of endpoint devices are time synchronized with the numerically sequenced packets, wherein the plurality of endpoint devices include internal network devices coupled to a residential gateway via a two-way measurement path, one of the plurality of endpoint devices being a set top box;

receiving the numerically sequenced packets at the endpoint device;

electronically storing packet data for the numerically sequenced packets at the endpoint device, wherein the packet data is stored for a user configurable time period;

collecting the packet data within the user configurable time period, the collecting performed by a collection server collecting packet data from the residential gateway; and using the collected packet data to determine one or more of: (i) packet loss information, and (ii) packet sequence information for the endpoint device.

2. The method of claim 1 further comprising determining a number of numerically sequenced packets that are lost or received out of sequence by the endpoint device.

3. The method of claim 2 further including establishing a predetermined threshold setting forth a maximum number of numerically sequenced packets to be lost or received out of sequence by the endpoint device.

4. The method of claim 3 further including transmitting a report if the determined number of numerically sequenced packets exceeds the predetermined threshold.

5. A computer program product for gathering a traffic profile for an endpoint device operably coupled to a network, the computer program product comprising a storage medium readable by a processing circuit and storing instructions for execution by the processing circuit for facilitating a method comprising:

sending a set of numerically sequenced packets substantially simultaneously to a plurality of endpoint devices on the network including the endpoint device, wherein the plurality of endpoint devices are time synchronized with the numerically sequenced packets, wherein the plurality of endpoint devices include internal network devices coupled to a residential gateway via a two-way measurement path, one of the plurality of endpoint devices being a set top box;

receiving the numerically sequenced packets at the endpoint device;

electronically storing packet data for the numerically sequenced packets at the endpoint device, wherein the packet data is stored for a user configurable time period;

collecting the packet data within the user configurable time period, the collecting performed by a collection server collecting packet data from the residential gateway; and using the collected packet data to determine one or more of:
(i) packet loss information, and (ii) packet sequence information for the endpoint device.

6. The computer program product of claim 5 further comprising instructions for determining a number of numerically sequenced packets that are lost or received out of sequence by the endpoint device.

7. The computer program product of claim 6 further including instructions for establishing a predetermined threshold setting forth a maximum number of numerically sequenced packets to be lost or received out of sequence by the endpoint device.

8. The computer program product of claim 7 further including instructions for transmitting a report if the determined number of numerically sequenced packets exceeds the predetermined threshold.

* * * * *